(12) United States Patent
Rush et al.

(10) Patent No.: US 10,756,552 B2
(45) Date of Patent: Aug. 25, 2020

(54) MANUAL SERVICE DISCONNECT SYSTEM AND METHOD FOR ENERGY STORAGE

(71) Applicant: General Electric Company, Schenectady, NY (US)

(72) Inventors: Kenneth McClellan Rush, Ballston Spa, NY (US); Darren Bawden Hickey, Clifton Park, NY (US); Keith Garrette Brown, Clifton Park, NY (US); Luca Tonini, Glenville, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 93 days.

(21) Appl. No.: 15/993,881

(22) Filed: May 31, 2018

(65) Prior Publication Data

US 2019/0131805 A1    May 2, 2019

Related U.S. Application Data

(60) Provisional application No. 62/579,385, filed on Oct. 31, 2017.

(51) Int. Cl.
*H02J 7/00* (2006.01)
*H01R 13/713* (2006.01)
(Continued)

(52) U.S. Cl.
CPC ......... *H02J 7/0031* (2013.01); *H01M 2/1077* (2013.01); *H01M 2/34* (2013.01);
(Continued)

(58) Field of Classification Search
CPC .......... H02J 7/0031; H02J 1/10; H02J 7/0034; H02J 7/0042; H01M 2/1077; H01M 2/34;
(Continued)

(56) References Cited

U.S. PATENT DOCUMENTS 6,261,123 B1   7/2001   Kruger et al.
8,574,004 B1   11/2013  Tarchinski et al.
(Continued)

FOREIGN PATENT DOCUMENTS

| CN | 206098486 U | 4/2017 |
| CN | 206116480 U | 4/2017 |
| JP | 2016048994 A | 4/2016 |

OTHER PUBLICATIONS

International Search Report and Written Opinion issued in connection with corresponding PCT Application No. PCT/US2018/50129 dated Jan. 9, 2019.
Masahiro Kimoto, "Impact of Manual Service Disconnect in an Automotive Traction Battery System (RESS)", SAE International, pp. 1-6, Mar. 28, 2017.

*Primary Examiner* — Travis S Chambers
(74) *Attorney, Agent, or Firm* — Armstrong Teasdale LLP (57) ABSTRACT

An energy storage module includes a module housing, a positive polarity module terminal and a negative polarity module terminal accessible via an external surface of the housing, and a plurality of battery cells contained within the housing and coupled in series between the positive polarity terminal and a negative polarity terminal to form a battery cell string. A removable manual service disconnect (MSD) unit is physically coupled to the external surface of the housing and electrically coupled between at least one battery cell in the battery cell string and one of the module terminals. The MSD unit has at least a first MSD operating state to allow current conduction between the positive polarity module terminal and the negative polarity module terminal, and a second MSD operating state to prevent current conduction between the positive polarity module terminal and the negative polarity module terminal.

27 Claims, 10 Drawing Sheets

(51) Int. Cl.
*H01M 10/42* (2006.01)
*H01M 2/34* (2006.01)
*H01M 2/10* (2006.01)
*H02J 1/10* (2006.01)
*H01M 2/20* (2006.01)
*H01R 13/703* (2006.01)

(52) U.S. Cl.
CPC .... *H01M 10/4207* (2013.01); *H01R 13/7132* (2013.01); *H02J 1/10* (2013.01); *H02J 7/0034* (2013.01); *H02J 7/0042* (2013.01); *H01M 2/206* (2013.01); *H01M 2/348* (2013.01); *H01M 2200/00* (2013.01); *H01M 2200/30* (2013.01); *H01R 13/703* (2013.01)

(58) Field of Classification Search
CPC .. H01M 10/4207; H01M 2/206; H01M 2/348; H01M 2200/00; H01M 2200/30; H01R 13/7132; H01R 13/703
USPC ........ 439/522, 507, 500, 174, 172, 171, 166
See application file for complete search history.

(56) References Cited

U.S. PATENT DOCUMENTS

| | | | |
|---|---|---|---|
| 9,297,860 | B2 | 3/2016 | Bertrand et al. |
| 9,321,340 | B2 | 4/2016 | Maskew et al. |
| 9,368,782 | B2 | 6/2016 | Soleski et al. |
| 9,509,096 | B2 | 11/2016 | Zhao et al. |
| 9,707,854 | B2 | 7/2017 | Biskup |
| 2003/0057958 | A1 | 3/2003 | Fukushima et al. |
| 2011/0302773 | A1* | 12/2011 | Chattot ............... H01M 2/1077 29/729 |
| 2013/0189547 | A1* | 7/2013 | Coxon ................ H01M 2/1077 429/7 |
| 2013/0288530 | A1* | 10/2013 | Zhao .................... H01M 2/206 439/627 |
| 2014/0193990 | A1 | 7/2014 | Zhao et al. |
| 2014/0342213 | A1* | 11/2014 | Ebisawa ............... H01R 9/2408 429/121 |
| 2017/0123471 | A1 | 5/2017 | Dulle et al. |
| 2018/0205058 | A1* | 7/2018 | Lee ......................... B60L 58/21 |

\* cited by examiner

MANUAL SERVICE DISCONNECT SYSTEM AND METHOD FOR ENERGY STORAGE

CROSS-REFERENCE TO RELATED APPLICATIONS

This application claims the benefit of U.S. Provisional Application No. 62/579,385 filed Oct. 31, 2017.

BACKGROUND

Some embodiments disclosed herein relate generally to energy storage systems and more specifically to energy storage systems having manual service disconnect features.

Energy storage installations are becoming increasingly more prevalent, particularly for example, those used in combination with renewable energy resources to help balance energy supply and demand in grid, microgrid, and residential applications. Depending upon the application, these energy storage systems may range in capacities from a few kilowatt hours (kWh) to many megawatt hours (MWh). These systems typically contain many battery cells electrically connected to power conversion equipment and electronics all within one or more housings. Due to the high voltages and currents involved with these energy storage systems, manufacturers typically ship the systems in a deenergized and disassembled state. For example, manufacturers may ship uncharged batteries and electrical components, such as busbars, unassembled in the system to avoid electrical shocks or arc events during shipping and customer installation. In such cases, the manufacturers may ship the partially assembled energy storage systems to their customers and highly skilled workers would then be required to complete the installation in the field. This may involve a laborious installation process which may then need to be validated and/or certified according to various regulatory requirements. Moreover, once certified the batteries within the energy storage systems would need to be charged before the system could be made fully operational. This labor-intensive installation process at the customer site coupled with the operational delays due to the extra charging time required once assembled, translate to a higher total cost of ownership to the customer for such conventional energy storage systems. Additionally, once operational, conventional energy storage systems must be taken completely off-line to service the batteries or subsystems, which can cause revenue loss to the customer or even create energy distribution disturbances in the system.

It would therefore be desirable to provide energy storage systems and methods that can be made fully operational faster than conventional energy storage systems and require less downtime for repairs than conventional systems.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

In various embodiments, an energy storage module is described which includes a plurality of battery cells coupled in series between a positive polarity terminal and a negative polarity terminal to form a battery cell string. The energy storage module further comprises a manual service disconnect unit having at least a first MSD operating state to allow current conduction between the positive polarity terminal and the negative polarity terminal, and a second MSD operating state to prevent current conduction between the positive polarity module terminal and the negative polarity module terminal. In accordance with various embodiments, a plurality of energy storage modules having one or more manual service disconnect units may be electrically coupled in series or in parallel series combinations to form a battery module string. One or more battery module strings may be further coupled together in parallel and installed within a container or housing as part of an energy storage system. In one embodiment, the battery module strings are coupled to a high voltage DC bus within the energy storage system such that a transition from the first MSD operating state to the second MSD operating state operatively disconnects a respective energy storage module or battery module string from the DC bus. In accordance with embodiments described herein, high power (e.g., kWh to MWh) energy storage systems utilizing the manual service disconnect units can be assembled, inspected and/or certified and the batteries can be pre-charged up to full capacity. The manual service disconnect units can be placed in a shipping mode such that the respective series circuit of each energy storage module is opened or otherwise deenergized and the systems can then be shipped in such a charged state to end customers. Once the energy storage system arrives and is sited at the customer location, the customer can quickly and easily change the operating state of the manual service disconnect units to an operational mode in which the energy storage system can provide energy to a load without further assembly unlike other conventional energy storage systems and particularly, other high-power, containerized energy storage systems.

Figure 1:
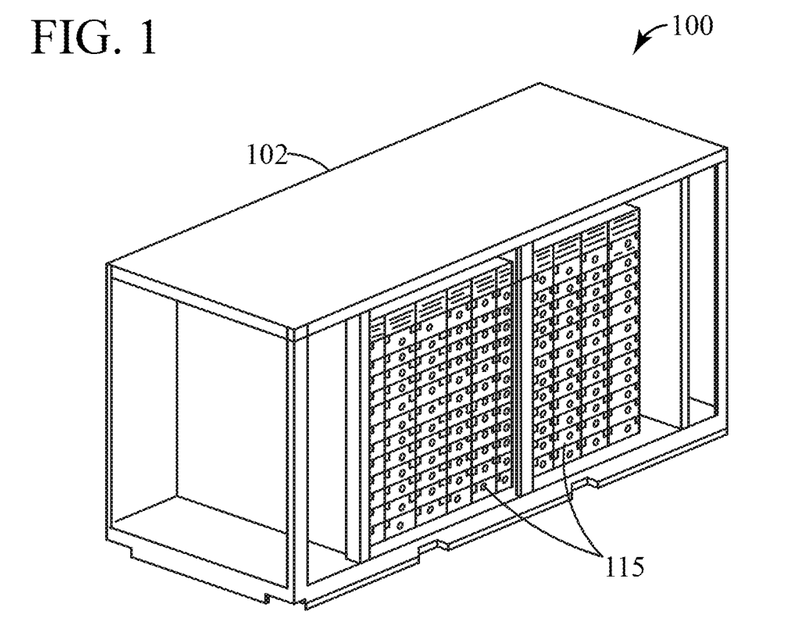
FIG. 1 illustrates an energy storage system according to some embodiments.

FIG. 1 illustrates an energy storage system 100 according to some embodiments. In the illustrated embodiment, energy storage system 100 includes a container 102 and multiple battery module strings 115 installed therein. In one embodiment, the container 102 may be an intermodal shipping container available, for example, from Sea Box, Inc. The container may include a single, open volume or it may contain separate compartments which may be used to store the battery module strings 115 separate from other electronics and cooling equipment. As will be described in further detail herein, container 102 may further include a high voltage DC bus to which the multiple battery module strings 115 may be electrically coupled in parallel.

Figure 2:
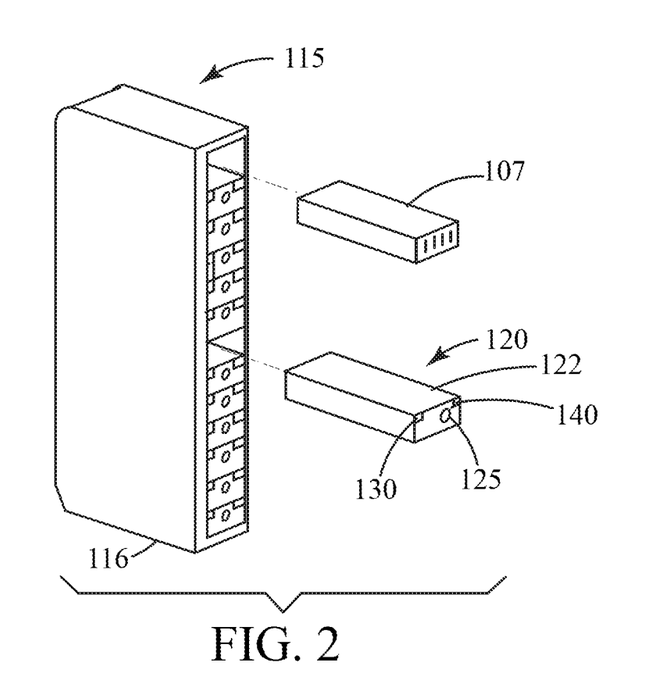
FIG. 2 illustrates a partially exploded view of a battery module string, according to some embodiments.

FIG. 2 illustrates a partially exploded view of a battery module string, according to some embodiments. Each battery module string 115 includes a plurality of energy storage modules 120 electrically coupled in series or in parallel series combinations to form a battery module string. One or more battery module strings 115 may further include a DC converter 107 to regulate voltage between a high voltage DC bus (e.g., shown in FIG. 15) and the energy storage modules 120. In one embodiment, the DC converter 107 may further include a controller such as a processor configured to store and process instructions, which wholly or partly control the respective battery module string 115. In accordance with embodiments described herein, the energy storage modules 120 may each include a module housing 122, a positive polarity module terminal 130, a negative polarity module terminal 140, and a manual service disconnect (MSD) unit 125 electrically coupled between at least one battery cell in the battery cell string and one of the module terminals. The term "between" as used herein may refer to (i) the manual service disconnect unit 125 being directly coupling to one of the module terminals and a battery cell with no other electrical components or battery cells electrically coupled therebetween, or (ii) the manual service disconnect unit 125 being indirectly coupled to one of the module terminals and a battery cell with one or more battery cells or other electrical components electrically coupled therebetween. For example, the manual service disconnect unit 125 could be installed between two battery cells within the battery cell string, which themselves are either coupled directly to the module terminals or indirectly coupled to the module terminals through one or more additional battery cells or electrical components. The energy storage modules 120 may further be removably stored within a battery module string housing 116.

Figure 3:
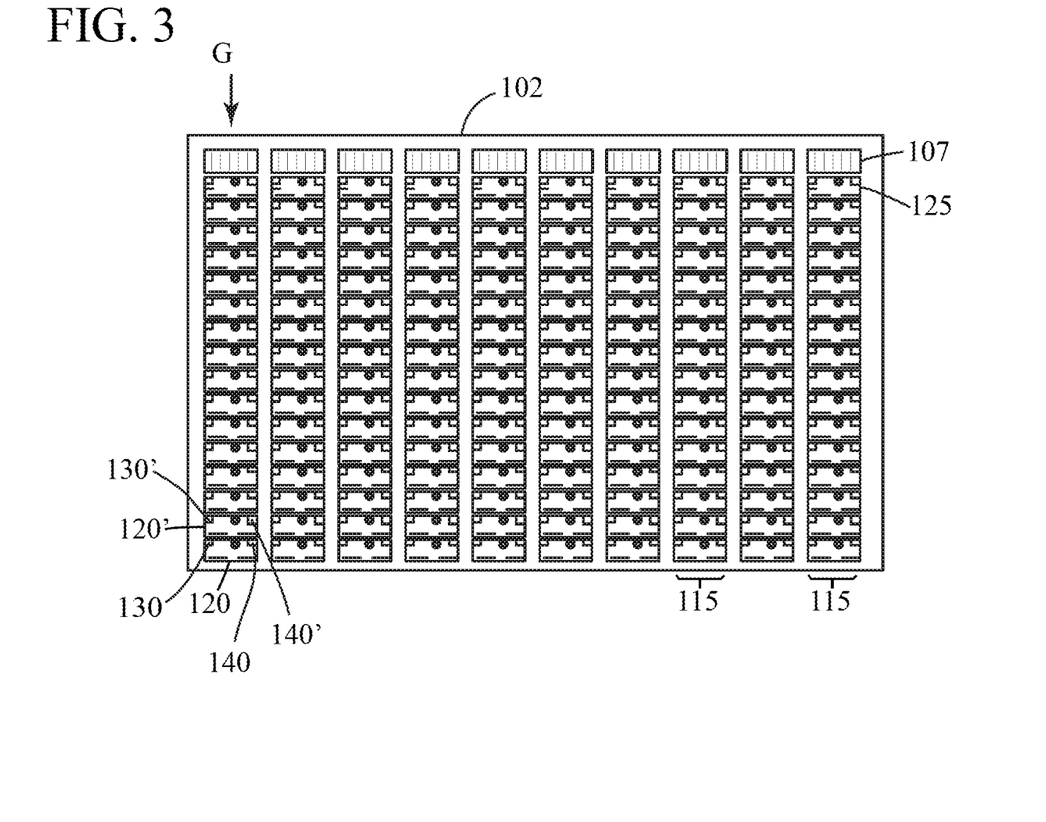
FIG. 3 illustrates an energy storage system having battery module strings disposed vertically in accordance with some embodiments.
Figure 11:
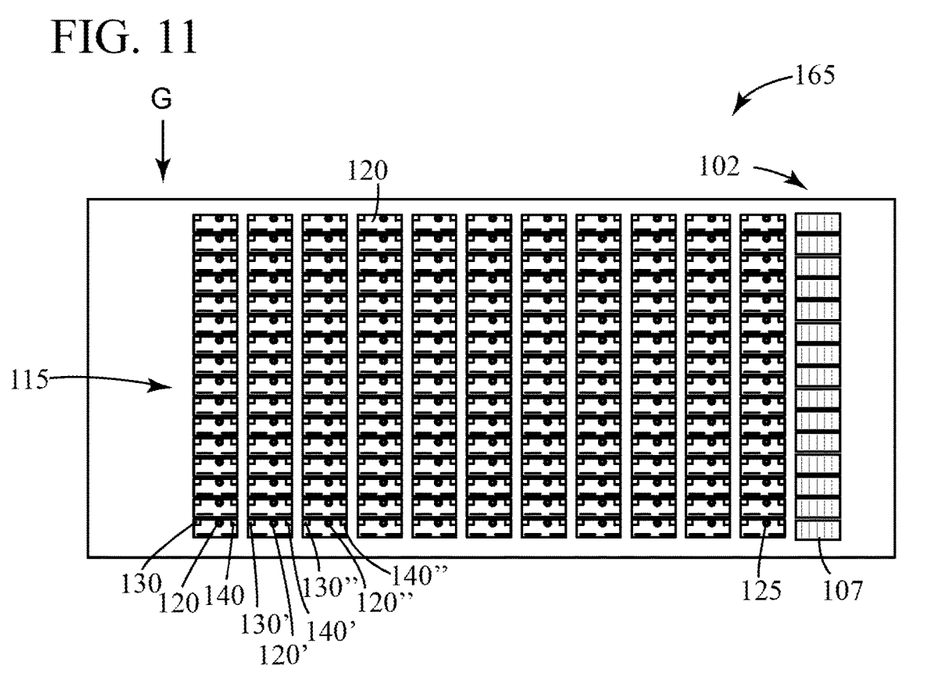
FIG. 11 illustrates an energy storage system having battery module strings disposed horizontally in accordance with an alternative embodiment.

FIG. 3 illustrates an energy storage system having battery module strings 115 disposed vertically within container 102 in accordance with some embodiments. As illustrated, battery module strings 115 each comprise a plurality of energy storage modules 120 electrically coupled in series and stacked vertically within a battery module string such that the force of gravity 'G' acts downward in a height dimension through each battery module string. In contrast, FIG. 11 illustrates an energy storage system having battery module strings 115 disposed horizontally within container 102 such that the force of gravity 'G' acts downward perpendicularly to each battery module string. In the illustrated embodiment, each battery module string further includes a respective DC converter at a connection point to the DC bus (not shown). In the illustrated embodiment, each energy storage module 120 further includes a manual service disconnect unit 125 and a positive polarity module terminal 130 and a negative polarity module terminal 140. In the illustrated embodiment, positive polarity module terminal 130 of energy storage module 120 is electrically coupled to negative polarity module terminal 140' of adjacent energy storage module 120'. Similarly, negative polarity module terminal 140 of energy storage module 120 is electrically coupled to positive polarity module terminal 130' of adjacent energy storage module 120'. In one embodiment, each battery module string 115 may have a positive polarity bus and a negative polarity bus to which each energy storage module 120 connects within the respective string. Examples of manual service disconnect units suitable for use in the systems and methods described herein include: EM30MSD available from Hirose Electric Co. LTD., and MSD 250A Plug and Receptacle available from TYCO Electronics.

Figure 4:
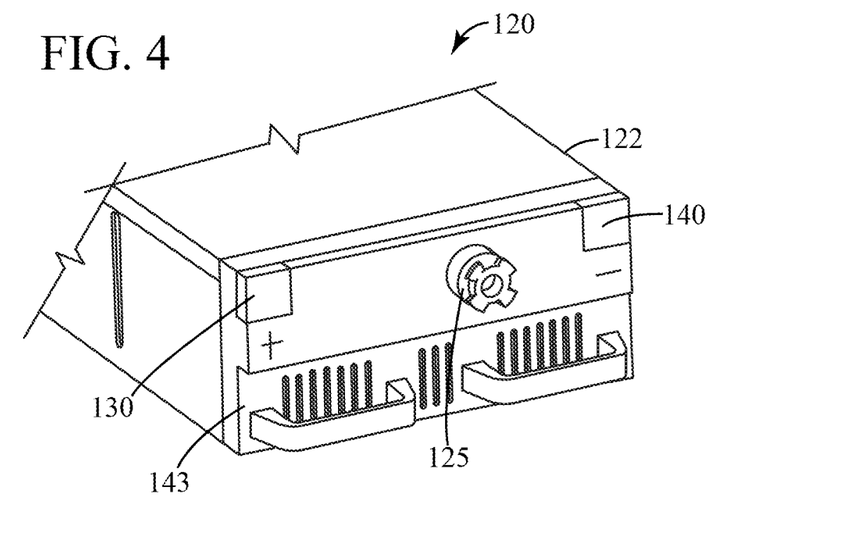
FIG. 4 illustrates an energy storage module in accordance with some embodiments.

FIG. 4 illustrates a partial and more detailed view of an energy storage module 120 in accordance with one embodiment. As shown, the energy storage module 120 includes a positive polarity module terminal 130 and a negative polarity module terminal 140 located on an external surface 143 of the energy storage module housing 122. It is to be understood that the positive and negative polarity terminals 130, 140 may be located on the same side of the energy storage module 120, on the same side on the front face of the energy storage module, on opposing sides of the front face of the energy storage module (as shown), nearby one another, or any other suitable configuration as desired in the specific application. In the illustrated embodiment, the manual service disconnect unit 125 is physically coupled to external surface 143 and positioned between the terminals 130,140. However, the manual service disconnect unit 125 could be located on any external surface of the energy storage module 120. In one embodiment, the manual service disconnect unit 125 is electrically coupled in series between at least one battery cell within the battery cell string and one of the module terminal 130,140. In one embodiment, manual service disconnect unit 125 comprises a user accessible non-conductive portion protruding from the external surface 143 which, when rotated or removed, causes the manual service disconnect unit 125 to change from the first MSD operating state to the second MSD operating state. The first MSD operating state may correspond to a high voltage operating mode of the energy storage module and the second MSD operating state may correspond to a low voltage shipping mode of the energy storage module. In the illustrated embodiment, the terminals 130,140 are located on a front panel of the housing 122 which is user-accessible when installed within the battery module string housing 116 and/or container 102. However, in other embodiments, the terminals 130,140 and manual service disconnect unit 125 may be located on other external surfaces depending upon the alignment of the energy storage modules within the system.

Figure 5:
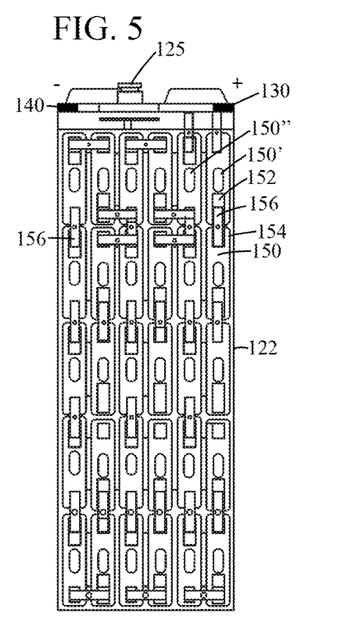
FIG. 5 illustrates an internal view of the energy storage module of FIG. 4 in accordance with some embodiments.
Figure 6:
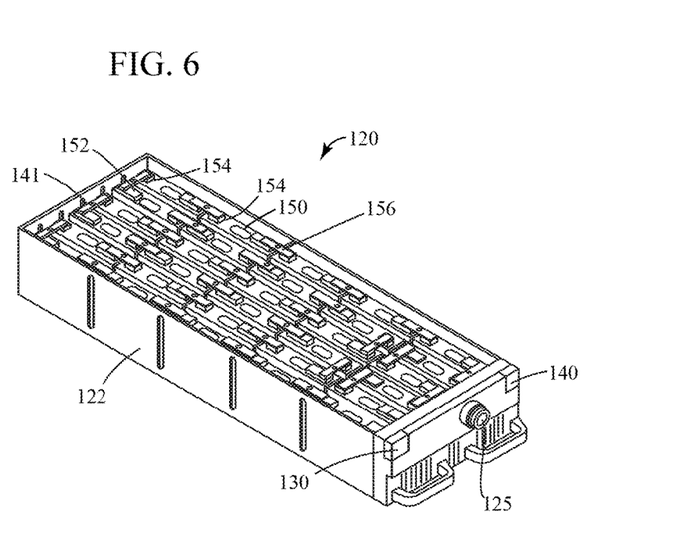
FIG. 6 illustrates an internal perspective view of the energy storage module of FIG. 4 in accordance with some embodiments.

FIG. 5 illustrates an internal view of the energy storage module 120 of FIG. 4 in accordance with various embodiments. FIG. 6 illustrates an internal perspective view of the energy storage module 120 of FIG. 4 in accordance with various embodiments. More specifically, FIG. 5 illustrates a plurality of battery cells 150 disposed within the module housing 122. Each battery cell 150 has a negative terminal 152 and a positive terminal 154. Moreover, the negative terminal 152 of a first battery cell 150 is electrically coupled to the positive terminal 154 of a second battery cell 150 through a conductive battery cell connector 156. In one embodiment, the battery cell connector 156 may comprise a fusible link. Multiple such battery cells may then be so coupled to form a battery cell string within the module housing 122. In one embodiment, a first battery cell 150' in the battery cell string is electrically coupled to the positive polarity module terminal 130 and a last battery cell 150" in the battery cell string is electrically coupled to the negative polarity module terminal 140. Although not shown, in other embodiments the first battery cell in the battery cell string instead may be coupled to a negative polarity module terminal and the last battery cell in the battery cell string may be coupled to a positive polarity module terminal. The manual service disconnect unit 125 may be coupled between the first battery cell or the last battery cell and one of the terminals whether it is a positive polarity module terminal or a negative module terminal. In one embodiment, the manual service disconnect unit 125 may be electrically coupled between at least one battery cell in the battery cell string and one of the module terminals. In a further embodiment, the manual service disconnect unit 125 may be electrically coupled in the middle of the battery cell string such that one or more battery cells are coupled between the manual service disconnect unit 125 and one or both module terminals 130,140. In such an embodiment, the manual service disconnect unit 125 may be physically located on external surface 141, for example.

Figure 7:
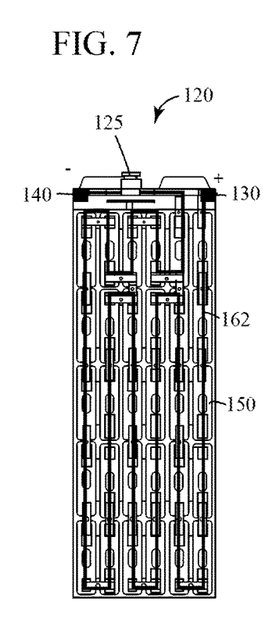
FIGS. 7-10 illustrate various conduction paths within an energy storage module according to some embodiments.
Figures 8, 9:
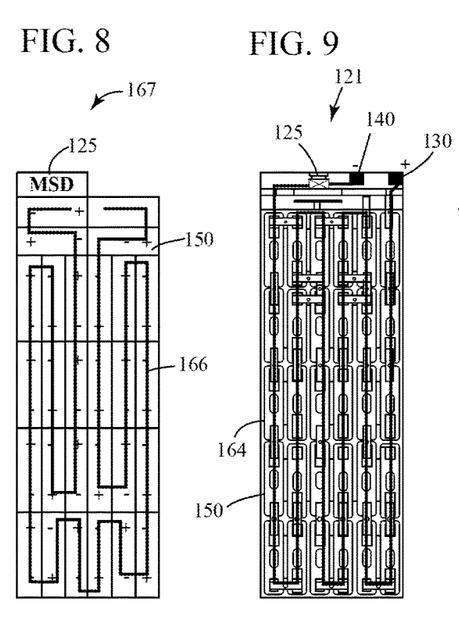
Figure 10:
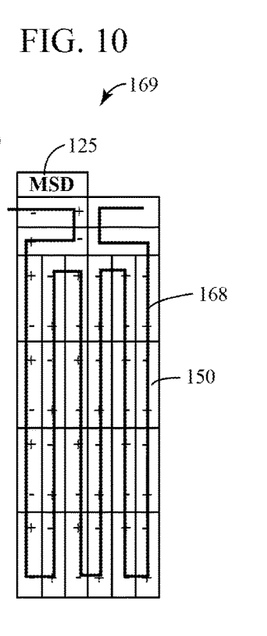

FIGS. 7-10 illustrate different battery cell conduction paths within an energy storage module according to various embodiments. In FIG. 7, energy storage module 120 includes a plurality of battery cells 150 configured as described with respect to FIG. 5 resulting in a conduction path 162 from the positive polarity module terminal 130 through the battery cells 150 and the manual service disconnect unit 125 to the negative polarity module terminal 140. In FIG. 8, energy storage module 167 illustrates an additional battery cell configuration resulting in conduction path 166. In FIG. 9, energy storage module 121 includes a plurality of battery cells 150 electrically coupled to provide a conduction path 164 from the positive polarity module terminal 130 through the battery cells 150 and the manual service disconnect unit 125 to the negative polarity module terminal 140. However, in FIG. 7, in energy storage module 120, the negative polarity module terminal 140 is physically located adjacent to and positioned between the positive polarity module terminal 130 and the manual service disconnect unit 125, despite being electrically coupled downstream of the manual service disconnect unit 125. In FIG. 10, energy storage module 169 illustrates an additional battery cell configuration resulting in conduction path 168.

Figure 12:
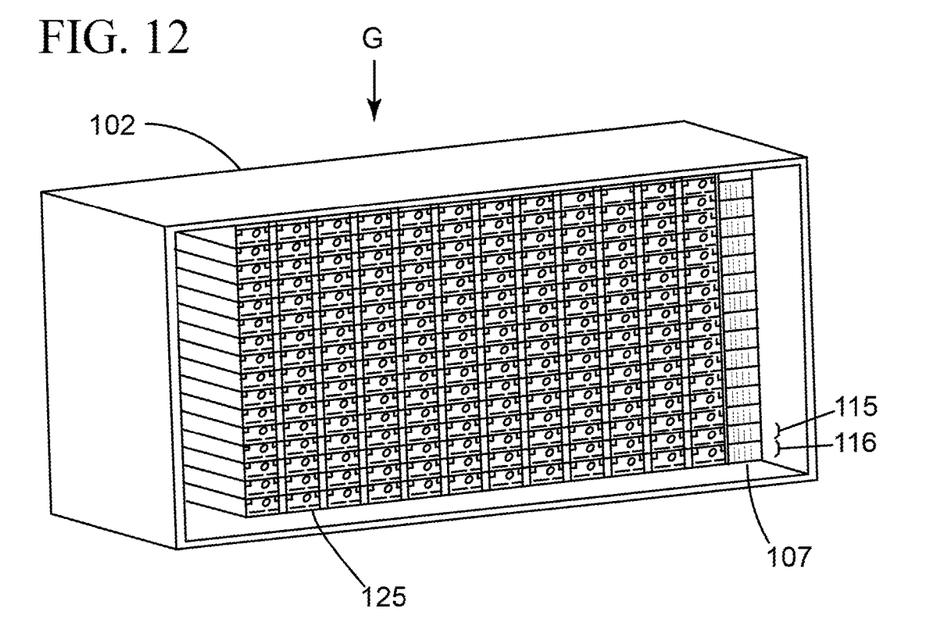
FIG. 12 illustrates a perspective view of an energy storage system having battery module strings disposed horizontally in accordance with the energy storage system of FIG. 11.

FIG. 11 illustrates an energy storage system 165 having battery module strings disposed horizontally in accordance with an alternative embodiment. FIG. 12 illustrates a perspective view of an energy storage system 165 having battery module strings disposed horizontally in accordance with the energy storage system 165 of FIG. 11. In the illustrated embodiment, battery module strings 115 each comprise a plurality of energy storage modules 120 electrically coupled in series and arranged horizontally adjacent within a battery module string such that the force of gravity 'G' acts downward in a height dimension through energy storage modules 120 across different battery module strings 115. More specifically, the battery module strings are electrically coupled in a horizontal direction that is orthogonal to the direction with which the force of gravity 'G' acts. In one embodiment, the positive polarity module terminal 130' of a first energy storage module 120' is electrically coupled to the negative polarity module terminal 140 of an adjacent second energy storage module 120 and the negative polarity module terminal 140' of the first energy storage module 120' is electrically coupled to the positive polarity module terminal 130" of an adjacent third energy storage module 120". One or more battery module strings 115 of energy storage system 165 may further include a DC converter 107 coupled to a high voltage DC electrical bus within container 102. In one embodiment, the DC converter 107 may further include a controller configured to store and process instructions, which wholly or partly control the respective battery module string 115.

Figure 13:
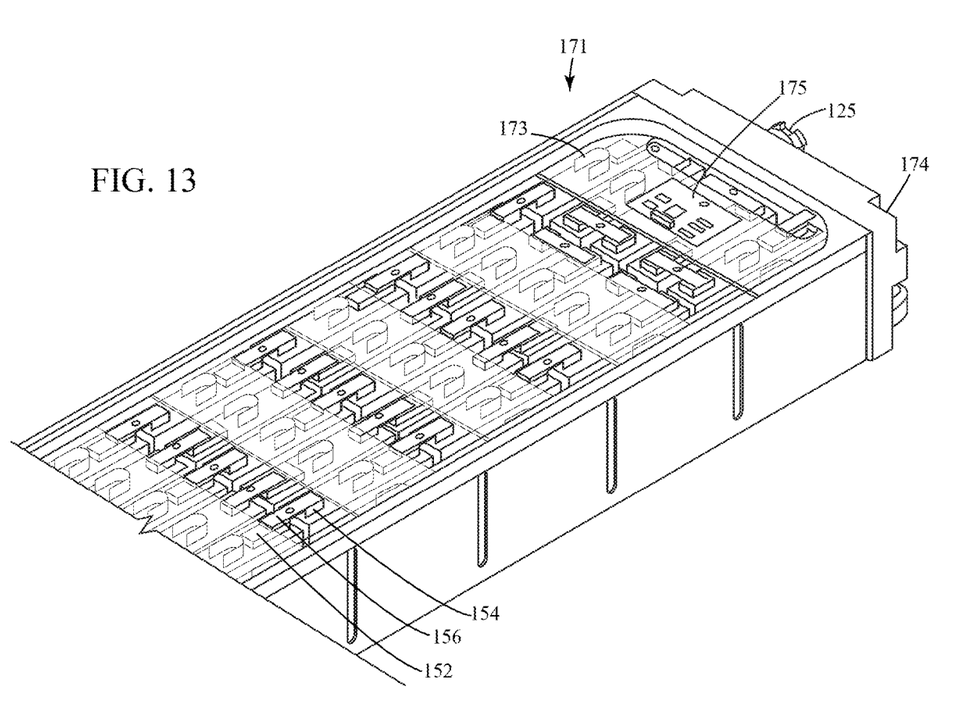
FIG. 13 illustrates a more detailed view of an energy storage module according to further embodiments.

FIG. 13 illustrates a more detailed view of an energy storage module 171 according to further embodiments. The negative terminal 152 of a first battery cell is electrically coupled to the positive terminal 154 of a second battery cell through a conductive battery cell connector 156 More specifically, the energy storage module 171 further illustrates alignment features designed to keep the battery cells 150 in place during movement or shipping, and vent baffles 173 to direct gas from the battery cells 150 away from the front panel 174 which faces the user/operator and contains the manual service disconnect unit 125. The energy storage module 171 further includes a battery management system (BMS) 175 configured to control operation of the battery module string within a respective energy storage module. In one embodiment, battery management system 175 may communicate with one or more battery module string level controllers such as that which may be incorporated into DC converter 107, for example.

Figure 14:
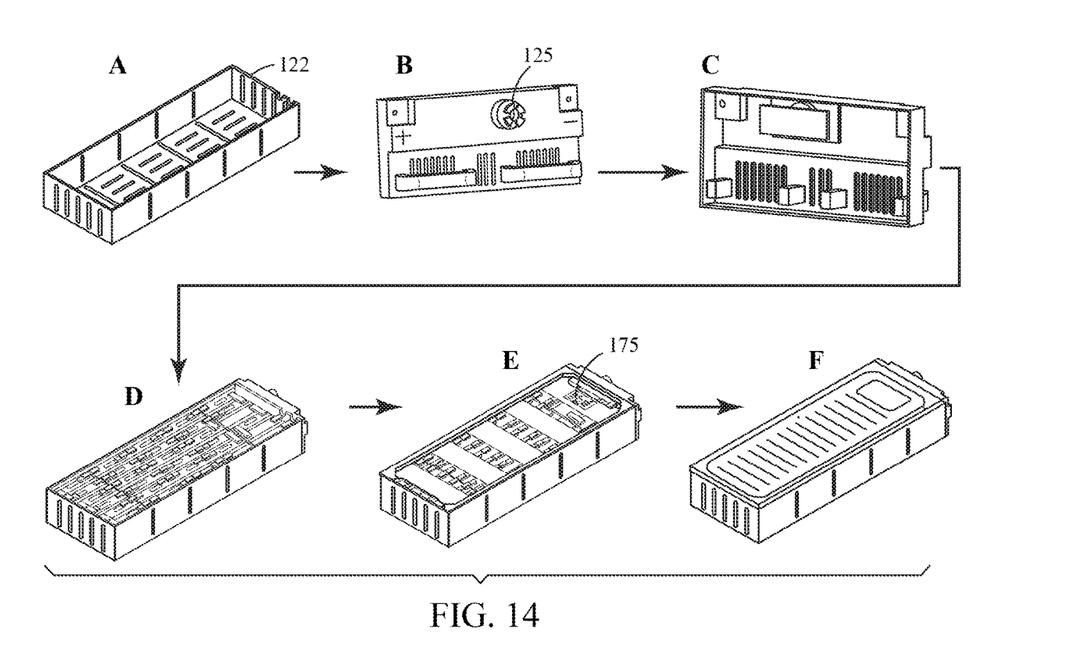
FIG. 14 diagrammatically illustrates a method of assembling an energy storage module in accordance with some embodiments.

FIG. 14 diagrammatically illustrates a method of assembling an energy storage module in accordance with some embodiments. In the illustrated embodiment, the module housing 122 (shown in step A) is provided and may be folded, assembled, stamped or otherwise manufactured. In step B, the front panel containing the manual service disconnect unit 125 is assembled and wired in step C. In step D, the front panel is coupled to the module housing 122, the housing is filled with battery cells 150, and the battery cells are electrically coupled. In one embodiment, battery cell connectors 156 are laser welded to the battery cells. In step E, a wiring harness is coupled to the module housing 122 and the BMS 175 is installed and wired before a lid is placed to seal the energy storage module in step F.

Figure 15:
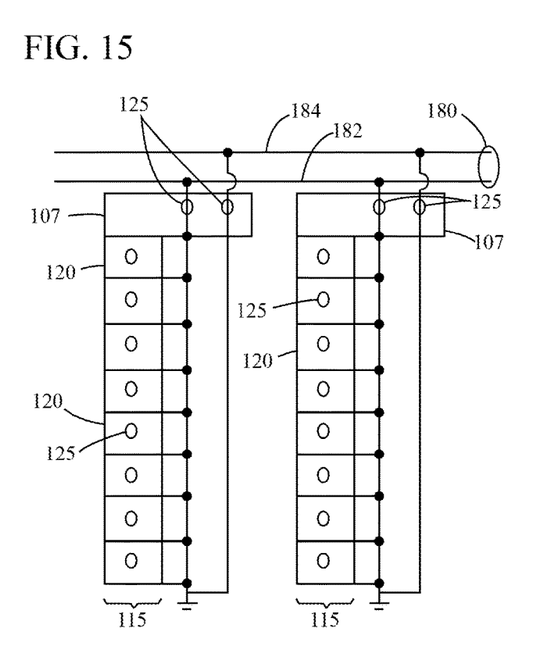
FIG. 15 is a schematic diagram illustrating a plurality of battery module strings coupled to a DC bus in accordance with some embodiments.

FIG. 15 is a schematic diagram illustrating a plurality of battery module strings 115 coupled in parallel to a high voltage (e.g., ~1500v or more) DC bus 180 in accordance with various embodiments. In the illustrated embodiment, each battery module string 115 includes a plurality of energy storage modules 120 electrically coupled in series and each including a manual service disconnect unit 125. Moreover, each battery module string 115 further includes a DC converter 107 coupled to a first leg 182 and a second leg 184 of the high voltage DC bus 180. In one embodiment, the DC converter 107 may include one or more manual service disconnect units 125. In a more specific embodiment, the DC converter 107 may include a first manual service disconnect unit 125 coupled between (e.g., in series with) the first leg 182 of the DC bus and the battery module string, and a second manual service disconnect unit 125 coupled between the second leg 184 of the DC bus and the battery module string. As with the manual service disconnect units associated with energy storage modules 120, the manual service disconnect unit(s) 125 associated with the DC converter 107 may similarly be mounted to or otherwise accessible through any external surface of the DC converter. By removing or otherwise changing the operating state of the manual service disconnect unit 125 associated with the DC converter 107, the effective voltage of the battery module string 115 can be substantially reduced. Similarly, by removing or otherwise changing the operating state of a manual service disconnect unit 125 associated with an energy storage module 120, the voltage present on that energy storage module 120 can be eliminated thereby reducing the voltage hazard present. Furthermore, by removing or otherwise changing the operating state of all the manual service disconnect units 125 within a given battery module string, the user/operator can eliminate the voltage hazard on that battery module string. For example, the effective voltage (V) of a battery module string 115 can be represented by $(m/n)*(p)=V$, where m is the voltage of the DC bus 180, n is the number of energy storage modules in the battery module string, and p represents the number of energy storage modules having a respective manual service disconnect unit 125 still installed and/or in an operating mode.

Figure 16:
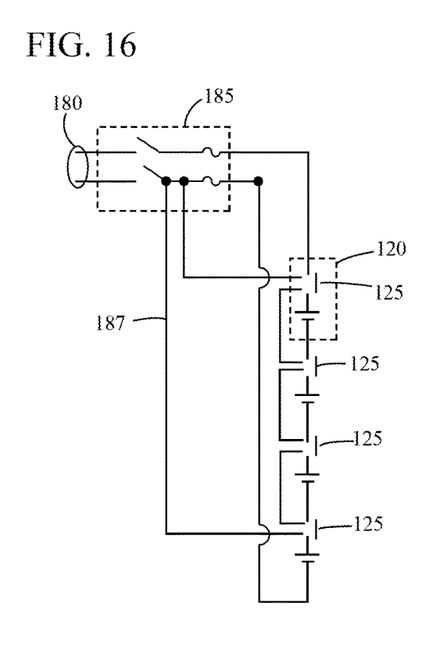
FIG. 16 is a schematic diagram illustrating a further embodiment of an energy storage system including a battery module string.

FIG. 16 is a schematic diagram illustrating a further embodiment of an energy storage system including a battery module string. In the illustrated embodiment, the battery module string includes a plurality of energy storage modules 120 which each include one or more battery cells and at least one manual service disconnect unit 125. The battery module string is further coupled to the DC bus 180 through a power conditioning system 185. In one embodiment, the power conditioning system 185 is configured to receive, combine, and condition power from the battery module strings for supply to a power network. In accordance with the illustrated embodiment, in addition to positive and negative connections, the manual service disconnect units 125 may further include a signal line connection which is electrically coupled to the power conditioning system 185 through signal line 187. In one embodiment, the power conditioning system 185 may detect the operating state of the manual service disconnect units 125 through the signal line 187 and alert a user/operator. Alternatively, the power conditioning system 185 may drive a signal on signal line 187 which enables and/or disables the manual service disconnect units 125 to/from changing operating modes. In one embodiment, one or more manual service disconnect units 125 may be coupled (e.g., electrically or physically) to an access panel or door of the container within which the battery storage string is contained. This way, when such access panel or door is opened by a user/operator, the operating state of the one or more manual service disconnect units 125 can be changed to a low voltage mode, thereby automatically reducing the risk of accidental shock by the user/operator while accessing the energy storage modules. The operating state can automatically be changed by way of the signal line 187, or the manual service disconnect unit 125 can be coupled to the access panel or door such that when the access panel or door is opened, the manual service disconnect unit gets pulled from its socket or rotated.

Figure 17:
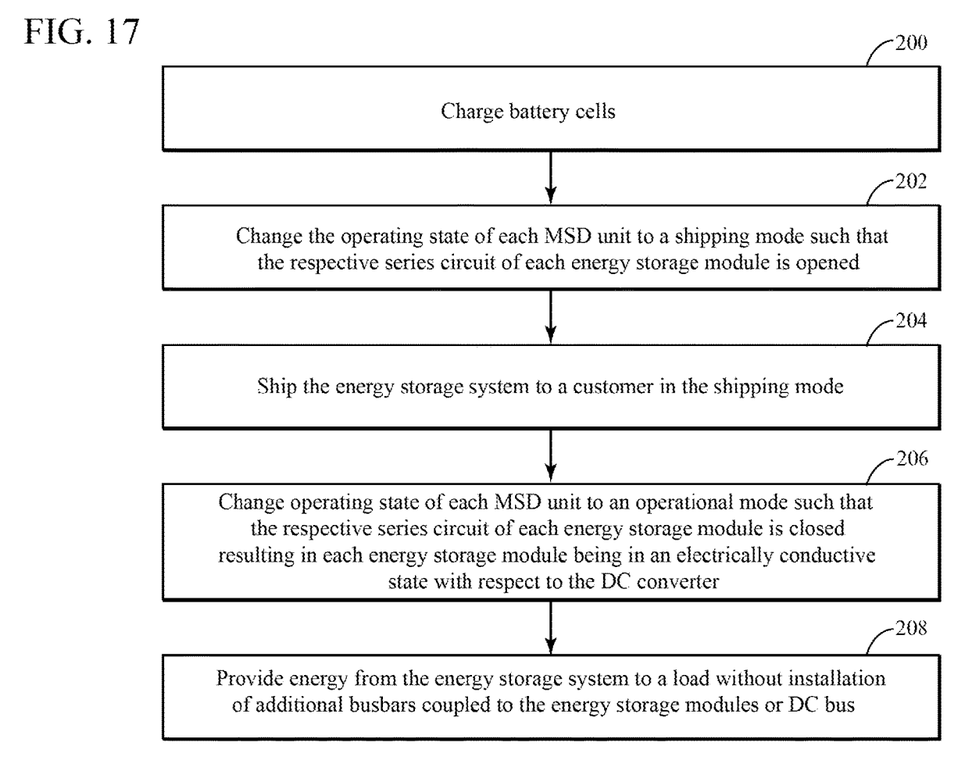
FIG. 17 is a flow chart illustrating a method of installing a containerized energy storage system according to some embodiments.

FIG. 17 is a flow chart illustrating one embodiment of a method of installing a containerized energy storage system such as energy storage system 100 or 165. In the illustrated embodiment, once the energy storage system is assembled and certified or otherwise authorized for operation, and before the energy storage system is shipped, the battery cells are charged in step 200. Prior to shipping to a customer, the operating state of each manual service disconnect unit is changed to a shipping mode such that the respective series circuit of each energy storage module is opened in step 202 and thereafter, the energy storage system is shipped to a customer in step 204. Once the energy storage system has arrived at the customer location and is coupled to the balance of plant, the operating state of the manual service disconnect units are changed to an operational mode such that the respective series circuit of each energy storage module is closed resulting in each energy storage module being in an electrically conductive state with respect to the DC converter in step 206. Lastly, the energy storage system provides energy to a load without installation of additional electrical equipment to the energy storage modules or DC bus in step 208.

Figure 18A:
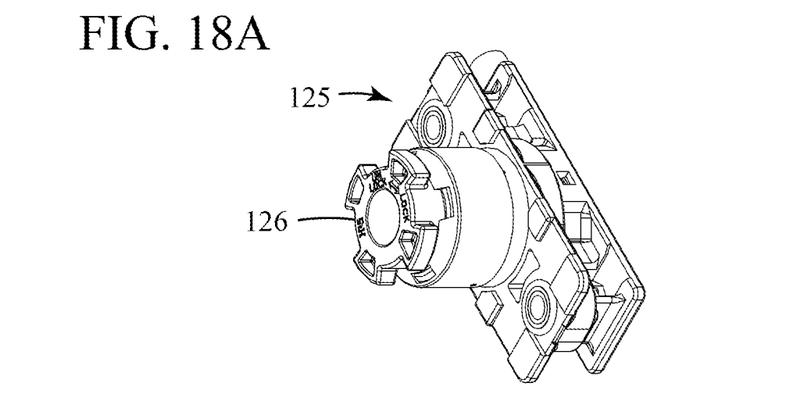
FIGS. 18a, 18b and 18c diagrammatically illustrate a method of electrically isolating an energy storage module by operating the manual service disconnect according to some embodiments.
Figure 18B:
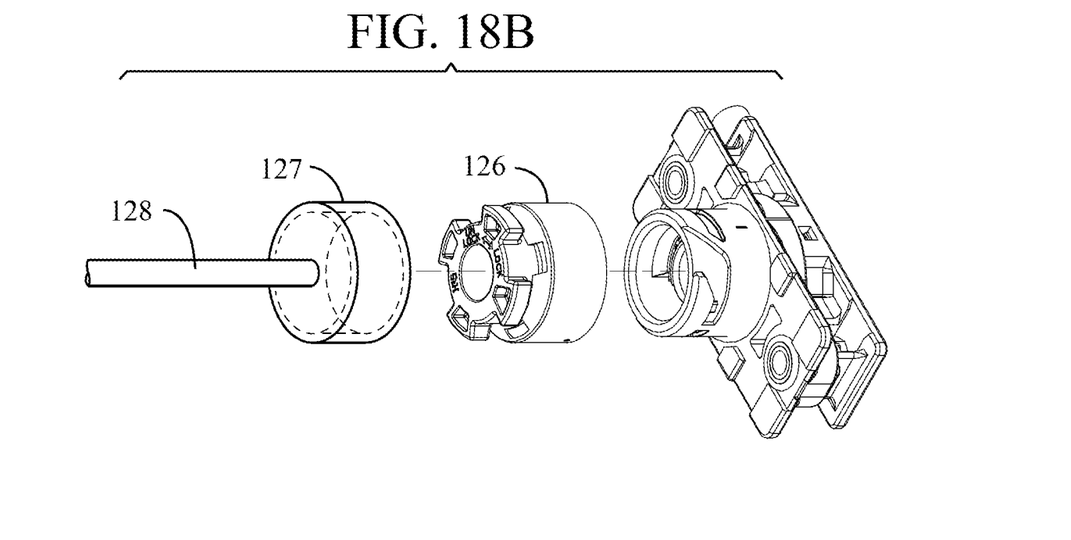
Figure 18C:
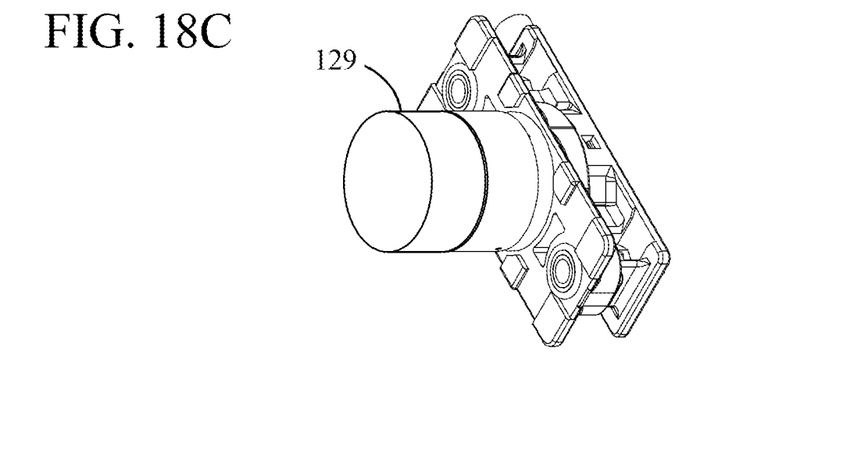

FIGS. 18a, 18b and 18c diagrammatically illustrate a method of electrically isolating an energy storage module 120 by operating the manual service disconnect 125. In FIG. 18a, the manual service disconnect 125 is configured to allow current flow between the positive and negative terminals 130, 140 (not shown), by the plug 126 providing an electrical path between conductors connected to each of the respective positive and negative terminals 130, 140. FIG. 18a shows the normal, in use, operating state of the manual service disconnect. The energy storage module 120 is omitted in FIGS. 18a-c for clarity. For service or shipping, it may be desirable to electrically disconnect the energy storage module 120, to prevent electrical hazards to humans in the vicinity of the energy storage module, or to prevent unwanted discharge of the battery cells. In FIG. 18b, the plug 126 is removed and this breaks the electrical path between terminals 130, 140 by forming an open circuit. The plug 126 is removed from its socket by rotating it counter-clockwise and pulling it out. This may be accomplished manually, or with a socket adapter 127 that is attached to a non-conductive pole 128. The pole 128 may be extendible (or telescoping) and permits a human operator to remain a safe distance away from the manual service disconnect 125 and the associated energy storage module 120. For example, the pole may extend from three feet to eight feet or more. The socket adapter 127 includes keys (not shown) to engage complementary features on plug 126. In FIG. 18c, an electrically insulating lock-out tag-out (LOTO) plug 129 may be inserted into the manual safety disconnect 125 to maintain the open circuit between respective positive and negative terminals. The LOTO plug 129 ensures that the energy storage module 120 is in an electrically disconnected state and is a highly visible indicator to any human operator that the energy storage module 120 is now in a safe state to work on. For example, the energy storage module 120 may be safely removed or shipped without danger to any nearby personnel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An energy storage module comprising:
a module housing;
a positive polarity module terminal and a negative polarity module terminal accessible via an external surface of the module housing;
a plurality of battery cells contained within the module housing and coupled in series between the positive polarity module terminal and the negative polarity module terminal to form a battery cell string; and
a removable manual service disconnect (MSD) unit comprising a socket and a plug configured to be coupled to the socket to provide an electrical path between the positive polarity module terminal and the negative polarity module terminal, the removable MSD unit physically coupled to the external surface and electrically coupled between at least one battery cell in the battery cell string and one of the module terminals, the manual service disconnect unit having at least a first MSD operating state in which the plug is coupled to the socket to allow current conduction between the positive polarity module terminal and the negative polarity module terminal, and a second MSD operating state in which the plug is removed from the socket to prevent current conduction between the positive polarity module terminal and the negative polarity module terminal, wherein the plug is further configured to be coupled to and removed from the socket using a non-conductive pole.

2. The energy storage module of claim 1, wherein the manual service disconnect unit is physically coupled between the positive polarity module terminal and the negative polarity module terminal.

3. The energy storage module of claim 1, wherein the first MSD operating state corresponds to a high voltage operating mode of the energy storage module and the second MSD operating state corresponds to a low voltage shipping mode of the energy storage module.

4. The energy storage module of claim 1, wherein the manual service disconnect unit comprises a user accessible non-conductive portion protruding from the external surface which, when rotated or removed, causes the MSD unit to change from the first MSD operating state to the second MSD operating state.

5. The energy storage module of claim 4, wherein the manual service disconnect unit is switchable between the first MSD operating state and the second MSD operating state, by removal of the MSD.

6. The energy storage module of claim 4, wherein the manual service disconnect unit is switchable between the first MSD operating state and the second MSD operating state, by rotation of the non-conductive portion.

7. The energy storage module of claim 1, wherein each battery cell has a positive and a negative terminal, a first battery cell in the battery cell string electrically coupled to one of the positive polarity module terminal and the negative polarity module terminal, a last battery cell in the battery cell string electrically coupled to a first terminal of the manual service disconnect unit and a second terminal of the manual service disconnect unit is coupled to a remaining one of the positive polarity module terminal and the negative polarity module terminal.

8. The energy storage module of claim 7, further comprising a fusible link coupled between a positive terminal of one battery cell and a negative terminal of another battery cell.

9. An energy storage system comprising:
a container;
a high voltage DC electrical bus within the container; and
a first battery module string electrically coupled to the DC electrical bus, the first battery module string including a plurality of energy storage modules located adjacent to one another and electrically coupled in series or parallel series combinations, each module comprising;
a module housing;
a positive polarity module terminal and a negative polarity module terminal accessible via an external surface of the module housing;
a plurality of battery cells contained within the module housing and coupled in series between the positive polarity module terminal and a negative polarity module terminal to form a battery cell string;
a removable manual service disconnect (MSD) unit comprising a socket and a plug configured to be coupled to the socket to provide an electrical path between the positive polarity module terminal and the negative polarity module terminal, the removable MSD unit physically coupled to the external surface of the module housing and electrically coupled between at least one battery cell in the battery cell string and one of the positive polarity or negative polarity module terminals, the manual service disconnect unit having at least a first MSD operating state in which the plug is coupled to the socket to allow current conduction between the positive polarity module terminal and the negative polarity module terminal, and a second MSD operating state in which the plug is removed from the socket to prevent current conduction between the positive polarity module terminal and the negative polarity module terminal, wherein the plug is further configured to be coupled to and removed from the socket using a non-conductive pole;
wherein the positive polarity module terminal of a first energy storage module is electrically coupled to the negative polarity module terminal of an adjacent second energy storage module and the negative polarity module terminal of the first energy storage module is electrically coupled to the positive polarity module terminal of an adjacent third energy storage module.

10. The energy storage system of claim 9, wherein the container comprises an intermodal shipping container.

11. The energy storage system of claim 9, wherein the first, second and third energy storage modules are horizontally adjacent along a length dimension of the container.

12. The energy storage system of claim 9, wherein the first, second and third energy storage modules are vertically adjacent along a height dimension of the container.

13. The energy storage system of claim 9, wherein the manual service disconnect unit is physically located on an external surface positioned between the positive polarity module terminal and the negative polarity module terminal.

14. The energy storage system of claim 9, wherein the first MSD operating state corresponds to a high voltage operating mode of the energy storage module and the second MSD operating state corresponds to a low voltage shipping mode of the energy storage module.

15. The energy storage system of claim 9, wherein the manual service disconnect unit comprises a user accessible non-conductive portion protruding from the external surface which, when rotated or removed, causes the manual service disconnect unit to change from the first MSD operating state to the second MSD operating state.

16. The energy storage system of claim 9, further comprising a controller and a signal line coupled between the controller and the manual service disconnect unit to remotely sense the MSD operating state.

17. The energy storage system of claim 9, further comprising a second battery module string electrically coupled to the DC electrical bus in parallel with the first battery module string, the second battery module string including a plurality of energy storage modules located adjacent to and coupled in series or parallel series combinations with each other.

18. The energy storage system of claim 9, further comprising a DC converter coupled to the DC electrical bus having a DC bus voltage (m) on one side and is coupled to the first battery module string on the other side, wherein the DC converter comprises a first manual service disconnect unit coupled in series with a first leg of the DC electrical bus such that removal of the first manual service disconnect unit causes the effective voltage of the first battery module string to be decreased from (m) to ((m)/(n))*p, where n is the number of energy storage modules in the first battery module string and p represents the number of energy storage modules having a respective manual service disconnect unit installed.

19. The energy storage system of claim 18, wherein the DC converter further comprises a second manual service disconnect unit coupled in series with a second leg of the DC electrical bus such that removal of the first and second manual service disconnect units causes the effective voltage of the first battery module string to be zero volts.

20. The energy storage system of claim 19, wherein the negative polarity module terminal is electrically coupled to the first leg of the DC electrical bus and the positive polarity module terminal is electrically coupled to the second leg of the DC electrical bus.

21. The energy storage system of claim 9, wherein each battery cell has a positive and negative terminal, a first battery cell in the battery cell string electrically coupled to one of the positive polarity module terminal and negative polarity module terminal, a last battery cell in the battery cell string electrically coupled to a first terminal of the manual service disconnect unit and a second terminal of the manual service disconnect unit is coupled to a remaining one of the positive polarity module terminal and the negative polarity module terminal.

22. The energy storage system of claim 21, further comprising a fusible link coupled between a positive terminal of one battery cell and a negative terminal of another battery cell.

23. A method of installing a containerized energy storage system comprising a DC bus, a DC-DC converter coupled to the DC bus, a first battery module string including a first plurality of energy storage modules electrically coupled to the DC bus, a second battery module string coupled to the DC bus in parallel with the first battery module string, the second battery module string including a second plurality of energy storage modules; each of the energy storage modules containing a plurality of battery cells coupled in series and a manual service disconnect (MSD) unit coupled in a series circuit with the plurality of battery cells and having at least two operating states, the method comprising:
    charging the battery cells;
    changing the operating state of each manual service disconnect unit to a shipping mode such that the respective series circuit of each energy storage module is opened;
    shipping the energy storage system to a customer in the shipping mode;
    changing the operating state of each manual service disconnect unit to an operational mode such that the respective series circuit of each energy storage module is closed resulting in each energy storage module being in an electrically conductive state with respect to the DC-DC converter; and
    providing energy from the energy storage system to a load without installation of additional electrical equipment to the energy storage modules or DC bus.

24. The method of claim 23, wherein the energy is provided to the load without a need to further charge the energy storage system after installation.

25. The method of claim 23, further comprising certifying the containerized energy storage system before shipping.

26. The method of claim 23, wherein each manual service disconnect unit is removed prior to shipping.

27. The method of claim 23, wherein providing energy from the energy storage system to a load without installation of additional electrical equipment comprises providing energy from the energy storage system to a load without installation of additional busbars.

* * * * *